under vacuum. The distilled residue is recovered in 100 ml. of water and 100 g. of crushed ice, is agitated for one hour, dried, washed and dried to constant weight. 9.7 grams of very impure, unrefined product are obtained.

United States Patent Office 3,649,622
Patented Mar. 14, 1972

3,649,622
21-ESTERS OF TRIAMCINOLONE AND ACETONIDES THEREOF
Jean Epuran, Monte-Carlo, Monaco, assignor to Laboratorie de Recherches Chimiques et Industrielles Morson, Principaute de Monaco
No Drawing. Filed Dec. 29, 1969, Ser. No. 888,936
Claims priority, application France, Dec. 31, 1968, 183,120; Mar. 31, 1969, 183,309
Int. Cl. C07c 169/32
U.S. Cl. 260—239.55
6 Claims

ABSTRACT OF THE DISCLOSURE

Inflammatory conditions in mammals are significantly diminished by oral or parenteral administration of the 21-esters of triamcinolone or their acetonides.

This invention relates to certain 21-esters of triamcinolone and their corresponding acetonides, the processes of preparing such compounds and the methods of treating mammals with such compounds for inflammatory conditions.

The 21-esters of this invention have the following formula:

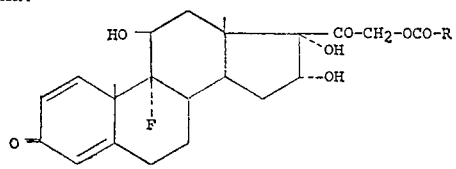

in which R is a monovalent radical having one of the following formulas:

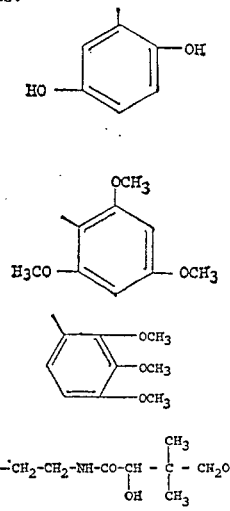

The corresponding acetonides of the 21-esters of triamcinolone have the following formula:

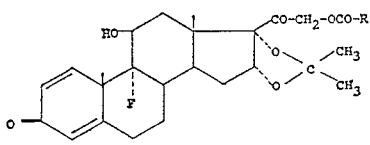

The 21-esters of triamcinolone are prepared by reacting triamcinolone with the required acid or an alkaline earth metal salt of such acid. The reaction, when the required acid is gentisic acid, is as follows:

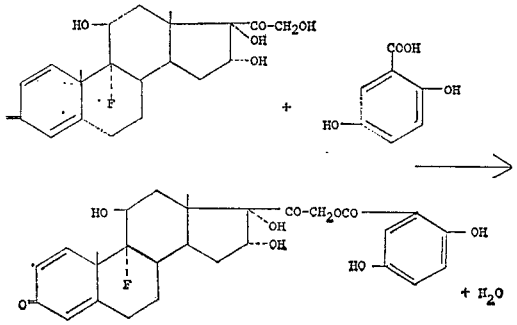

A more comprehensive understanding of this invention is obtained by reference to the following examples without limiting the invention.

EXAMPLE I

Triamcinolone gentisate

Into a 300 ml. flask equipped with an agitator, a thermometer, a dropping funnel and a refrigerant, there are introduced 3.7 g. of pure gentisic acid (20% excess), 120 ml. of anhydrous tetrahydrofuran and 2.5 g. of anhydrous triethylamine. A solution is obtained with little heating.

The solution is cooled at $-5°$ C. and at that temperature there is introduced dropwise a solution of 26 g. of freshly distilled ethyl chloroformate and 50 ml. of anhydrous tetrahydrofuran.

When the addition is completed, the mixture is agitated for one hour at $-5°$ C. and then there are added 8 g. of 21-alcohol of triamcinolone in a slightly nitrogenous atmosphere. The mixture is agitated in a nitrogen atmosphere for one hour at $0°$ C. and then for six hours at room temperature. It is then allowed to stand overnight. The agitation under nitrogen is resumed and the mixture is heated at reflux continued for ten hours.

When the reaction is completed, the solvent is removed by distillation first at normal pressure, and then under vacuum. The distilled residue is recovered in 100 ml. of water and 100 g. of crushed ice, is agitated for one hour, dried, washed and dried to constant weight. 9.7 grams of very impure, unrefined product are obtained.

A first crystallization is effected in an aqueous alcoholic mixture containing 68% alcohol and a product melting at 237–238° C. is obtained. In recrystallization in 80% tetrahydrofuran, 5 grams of triamcinolone gentisate melting at 263° C. are obtained.

The formula of the resulting triamcinolone gentisate is:

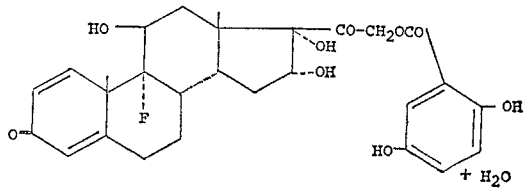

EXAMPLE II

Triamcinolone 2,4,6-trimethoxybenzoate

Into a 250 ml. flask equipped as in Example I, there is introduced 2.2 g. of 2,4,6-trimethoxybenzoic acid (0.01 mol), 50 ml. of anhydrous acetone and 1.2 g. of anhydrous triethylamine. Dissolution is instantaneous. The solution is cooled at $-5°$ C. and there are added dropwise at that temperature 13 g. of freshly distilled ethyl chloroformate.

Precipitation occurs quickly. The mixture is agitated for one hour at −5° C. and 2 g. of triamcinolone and 50 ml. of anhydrous acetone are added.

The mixture is agitated for one hour at 0° C., then for six hours at room temperature. It is refluxed and then left standing for nine hours.

It is then concentrated to dryness under vacuum and the residue is recovered in 100 ml. of water and 100 g. of ice, agitated for two hours, then allowed to stand for ten hours. It is dried, washed and dried to constant weight. Three grams of unrefined product are obtained (M.P. 250° C.). This product when crystallized in ethanol gives a white product (M.P. 250–251° C.) which is the triamcinolone 2,4,6 trimethoxybenzoate having the formula:

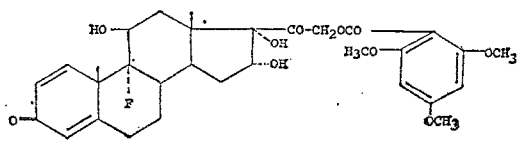

EXAMPLE III

Triamcinolone 1,2,3-trimethoxybenzoate

The procedure of Example II is followed except that, instead of employing 2.2 g. of 2,4,6-trimethoxybenzoic acid, 2.2 g. of 1,2,3-trimethoxybenzoic acid (0.01 mol) are employed. The resulting triamcinolone 1,2,3-trimethoxybenzoate has the following formula:

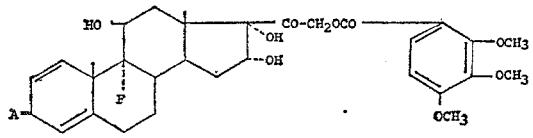

EXAMPLE IV

Triamcinolone pantothenate

In a 250 ml. flask equipped as in Example I, there are introduced 2.62 g. of calcium pantothenate and 34 ml. of dimethylformamide. The mixture is heated and agitated in a nitrogen atmosphere to effect dissolution, then cooled at −5° C. by means of an outside refrigerant mixture. There is then added dropwise at that temperature a solution of 25 ml. of ethyl chloroformate and 60 ml. of tetrahydrofuran.

After agitation for thirty minutes at −5° C., 2 g. of triamcinolone and 0.5 g. of triethanolamine are added.

The mixture is agitated for one hour at 0° C., then for ten hours at room temperature and then refluxed for five hours.

When the reaction is completed, the solvent is removed by distillation under vacuum and the residue is recovered in 100 ml. of water and 100 g. of ice. The mixture is agitated for one hour, then allowed to stand under 2° C. refrigeration for 24 hours. It is dried, washed and dried. 3.1 g. of unrefined product are obtained (M.P. 236–237° C.)

The product is crystallized in a methanol chloroform mixture (50/50) and 2.5 g. of pure triamcinolone pantothenate are obtained (M.P. 240° C.), having the formula:

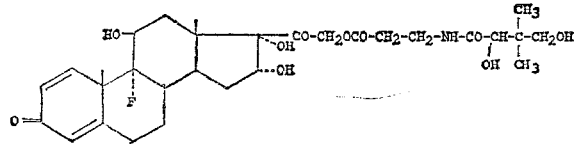

The acetonides corresponding to the 21-esters prepared in accordance with Examples I through IV may be produced by reacting triamcinolone acetonide with the acid chloride of the required acid. For example, the acetonide of the 21-ester of Example I may be produced by reacting the acid chloride of gentisic acid with the triamcinolone acetonide.

The anti-inflammatory efficacy in mammals of the compounds of this invention has been determined by pharmacological testing of edema induced by carragheen in rats.

Groups of 6 Wistar male rats, weighing about 125 g., received an injection in the paw of a 1% carragheen suspension in an isotonic solution of sodium chloride in a volume of 0.05 ml. The compounds tested were administered orally, one hour before the injection of the carragheen, in volume of 1 ml. per 100 g. of body weight.

The volume of the edema was measured by plethysmograph three hours after the administration of the inflammatory agent.

The results of the testing of two compounds of this invention are as follows:

| Composition | Doses, mg./kg. | Percent increase of volume of paw | Inhibition of edema (Percent) | Comparison in tests |
|---|---|---|---|---|
| Triamcinolone pantothenate | 23 | 20 | 65 | $p<0.05$ |
| Triamcinolone gentisate | 20 | 19 | 67 | $p<0.01$ |

The experimental results show the high anti-inflammatory efficacy of the compositions of this invention which can be administered orally or parenterally to mammals such as humans, dogs, horses and cats in the form of tablets, enterically coated capsules, suppositories or pomades. The dosage may vary over relatively wide limits. As indicated in the above table, a dosage of from 20 to 23 mg./kg. of the mammals treated is significantly effective in the treatment of inflammatory conditions. The duration of the treatment and dosages utilized vary with the condition treated. Such treatment and dosage in a particular situation would be determined by a skilled physician or veterinarian.

What is claimed is:

1. A compound selected from the class consisting of 21-esters of triamcinolones and acetonides of said esters, said esters having the formula:

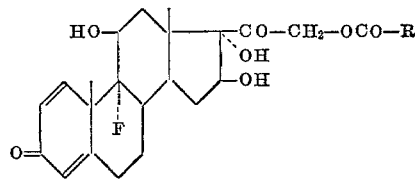

in which R is the monovalent radical having one of the formulas:

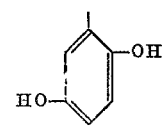

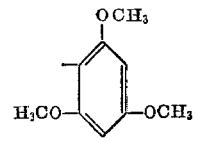

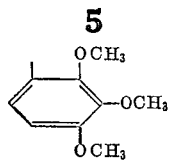

or

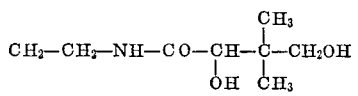

2. A compound of claim 1 which is triamcinolone gentisate or the acetonide thereof.

3. A compound of claim 1 which is triamcinolone 2,4,6-trimethoxybenzoate or the acetonide thereof.

4. A compound of claim 1 which is triamcinolone 1,2,3-trimethoxybenzoate or the acetonide thereof.

5. A compound of claim 1 which is triamcinolone pantothenate or the acetonide thereof.

6. The method of treating inflammatory conditions in a mammal which comprises administering to said mammal an anti-inflammatory effective dose of a compound of claim 1.

References Cited

UNITED STATES PATENTS 2,857,404  10/1958  Gash _____ 260—397.4

ELBERT L. ROBERTS, Primary Examiner

U.S. Cl. X.R.

260—397.45; 424—243